United States Patent
Muhonen

(10) Patent No.: US 7,890,100 B2
(45) Date of Patent: Feb. 15, 2011

(54) METHODS FOR ALLOCATING ROAMING NUMBER AND FORMING VISITOR LOCATION REGISTER IN MOBILE NETWORK, AND MOBILE NETWORK

(75) Inventor: Janne Muhonen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/512,691

(22) PCT Filed: Jun. 13, 2003

(86) PCT No.: PCT/FI03/00477

§ 371 (c)(1),
(2), (4) Date: Oct. 27, 2004

(87) PCT Pub. No.: WO03/107705

PCT Pub. Date: Dec. 24, 2003

(65) Prior Publication Data

US 2005/0181788 A1    Aug. 18, 2005

(30) Foreign Application Priority Data

Jun. 18, 2002   (FI) .................................. 20021179

(51) Int. Cl.
*H04Q 7/20* (2006.01)

(52) U.S. Cl. .................... 455/432.1; 455/423; 455/433; 455/434; 455/405; 455/445

(58) Field of Classification Search ............. 455/432.3, 455/432, 560, 426.1, 332, 332.1, 433, 412.1, 455/562, 458, 513, 62, 445, 461, 456, 406, 455/432.1, 453, 405, 408, 450; 379/59, 115, 379/131; 705/7–10

See application file for complete search history.

(56) References Cited

U.S. PATENT DOCUMENTS

| | | | |
|---|---|---|---|
| 5,467,381 A | | 11/1995 | Peltonen et al. |
| 5,655,217 A | * | 8/1997 | Lemson ...................... 455/513 |
| 5,721,762 A | * | 2/1998 | Sood .......................... 455/466 |
| 5,884,169 A | * | 3/1999 | Uchiyama et al. ........... 455/433 |
| 6,035,198 A | * | 3/2000 | Wiehe ........................ 455/445 |
| 6,097,948 A | * | 8/2000 | Sjodin ..................... 455/426.1 |
| 6,208,872 B1 | * | 3/2001 | Schmidt ..................... 455/518 |
| 6,408,181 B1 | | 6/2002 | Ho et al. |

(Continued)

FOREIGN PATENT DOCUMENTS

EP          1 257 139 A1      11/2002

(Continued)

*Primary Examiner*—Charles N Appiah
*Assistant Examiner*—Michael T Vu
(74) *Attorney, Agent, or Firm*—Harrington & Smith

(57) ABSTRACT

The invention relates to a method for allocating a roaming number to a subscriber in a mobile network comprising networks elements jointly used by at least two network operators. The invention further relates to a method for forming a visitor location register which allocates roaming numbers in a shared mobile network. The invention also relates to a shared mobile network. The invention is based on the idea of forming, in the visitor location register, roaming numbers of the network operators sharing the mobile network such that when the roaming numbers are being allocated, calls of the subscriber are routed in a desired manner in the networks of the network operators sharing the network.

22 Claims, 2 Drawing Sheets

U.S. PATENT DOCUMENTS

Figure 1:
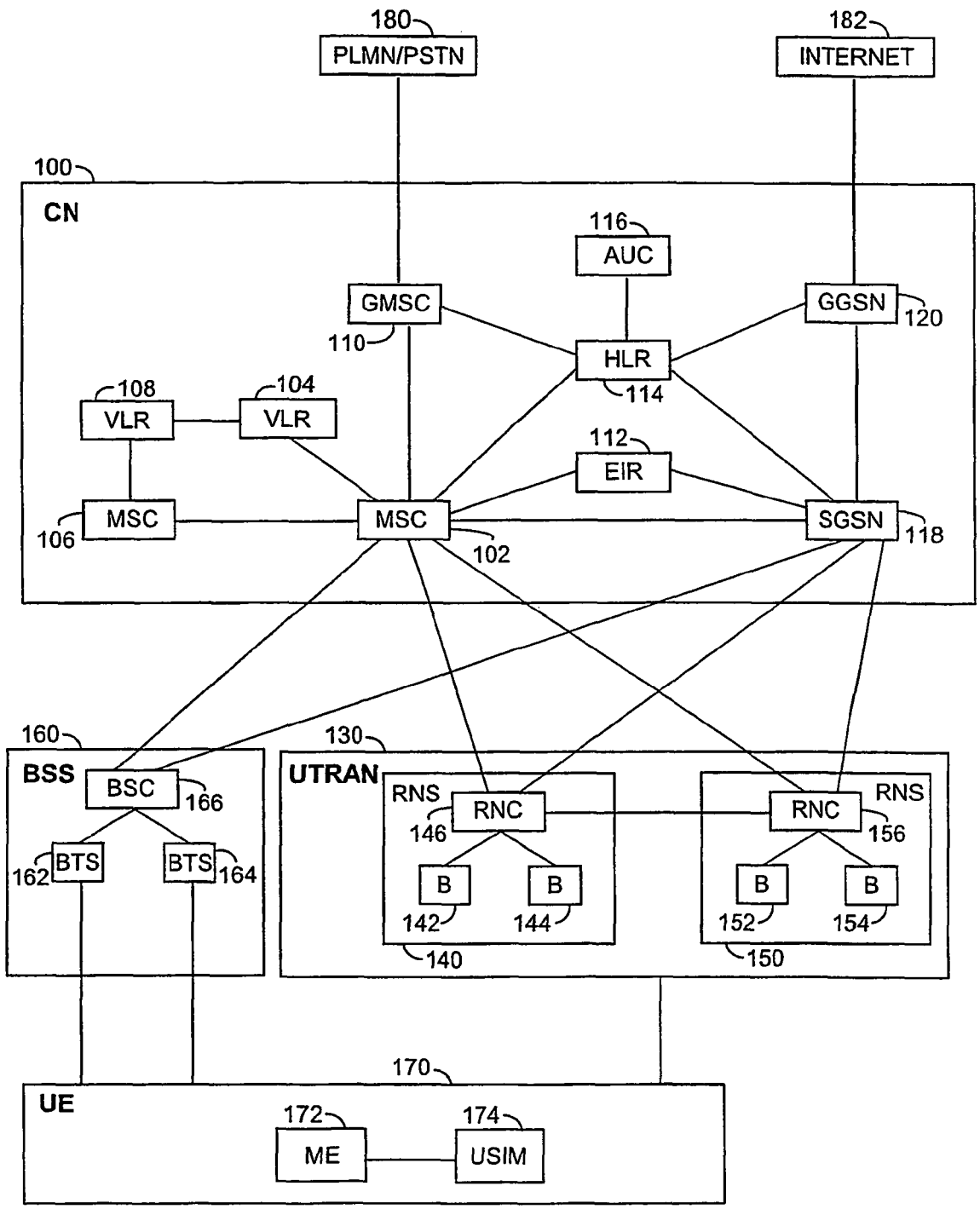

| | | | |
|---|---|---|---|
| 6,463,288 B1 * | 10/2002 | Havinis et al. | 455/456.1 |
| 6,560,455 B2 * | 5/2003 | Amin et al. | 455/432.3 |
| 6,662,017 B2 * | 12/2003 | McCann et al. | 455/461 |
| 6,771,983 B1 * | 8/2004 | Turina et al. | 455/560 |
| 6,788,926 B1 * | 9/2004 | Frangione et al. | 455/405 |
| 7,058,165 B2 * | 6/2006 | Koskinen et al. | 379/115.03 |
| 7,130,807 B1 * | 10/2006 | Mikurak | 705/7 |
| 2002/0058506 A1 * | 5/2002 | Amin et al. | 455/432 |
| 2003/0050100 A1 * | 3/2003 | Dent | 455/562 |
| 2003/0064723 A1 * | 4/2003 | Thakker | 455/432 |
| 2003/0114154 A1 * | 6/2003 | Lin et al. | 455/432 |
| 2004/0005892 A1 * | 1/2004 | Mayer et al. | 455/432.1 |
| 2004/0259531 A1 * | 12/2004 | Wood et al. | 455/412.1 |

FOREIGN PATENT DOCUMENTS

| | | |
|---|---|---|
| WO | WO 97/17816 | 5/1997 |
| WO | WO 99/01004 | 1/1999 |
| WO | WO 00/38461 | 6/2000 |

* cited by examiner

METHODS FOR ALLOCATING ROAMING NUMBER AND FORMING VISITOR LOCATION REGISTER IN MOBILE NETWORK, AND MOBILE NETWORK

FIELD

The invention relates to a method and a mobile network for allocating a roaming number for a call of a subscriber. The invention further relates to a method for forming a register which allocates roaming numbers.

BACKGROUND

As mobile communication becomes more and more global and new mobile generations become more common and the number of network operators providing mobile services increases, the need to share mobile network resources between several network operators has increased considerably. Mobile networks are shared e.g. when a group of network operators together receive a license for setting up a 3G mobile communication system but each of the network operators has its own infrastructure, which will at least partly be used as before. A shared mobile communication system thus comprises network elements that are jointly used by network operators and elements that are privately used by each network operator.

A network operator that does not belong to the above-mentioned network sharing system may utilize a shared mobile network by using a roaming service provided by such a shared mobile network.

A problem with the prior art solution is the routing of a call of a subscriber such that the routing takes place in a desired manner in the network elements managed by the network operators that participate in sharing the network. The routing of the call is based on a roaming number allocated to the call of a subscriber by a visitor location register of the visited mobile network, the allocation of the roaming number in the prior art solutions being based on the location area of the visited location register of the subscriber. The roaming number to be allocated according to the prior art cannot thus be used for routing a call in a shared mobile network.

BRIEF DESCRIPTION

An object of the invention is to provide an improved method and an improved mobile network for allocating a roaming number, and an improved method for forming a visitor location register.

An aspect of the invention is a method for allocating a roaming number to a call of a subscriber in a mobile network comprising elements shared between at least two network operators, the method comprising receiving an order for a call of the subscriber and allocating the roaming number to the call of the subscriber such that the allocation is directed at a roaming number of each network operator sharing the mobile network at a predetermined frequency.

An aspect of the invention is a mobile network comprising elements shared between at least two network operators, the mobile network further comprising: a radio access network for establishing a radio connection for a subscriber; a core network connected to the radio access network for establishing a connection for the subscriber; a register of the core network for allocating a roaming number to a call of the subscriber, the register is configured to allocate the roaming number to the call of the subscriber such that the allocation is directed at a roaming number of each network operator sharing the mobile network at a predetermined frequency.

An aspect of the invention is a method for forming a visitor location register in a mobile network comprising elements shared between at least two network operators, the method comprising forming, in the visitor location register, roaming numbers of the network operators sharing the mobile network.

Preferred embodiments of the invention are disclosed in the dependent claims.

The invention is based on the idea that by forming, in a visitor location register of a shared mobile network, roaming numbers of the network operators sharing the mobile network and by allocating the roaming numbers of each network operator in a predetermined proportion, it becomes possible to route calls of a subscriber in a manner desired by the network operators.

The invention provides several advantages; for example, the invention enables the resources of a shared mobile network to be controlled.

LIST OF DRAWINGS

Figure 2:
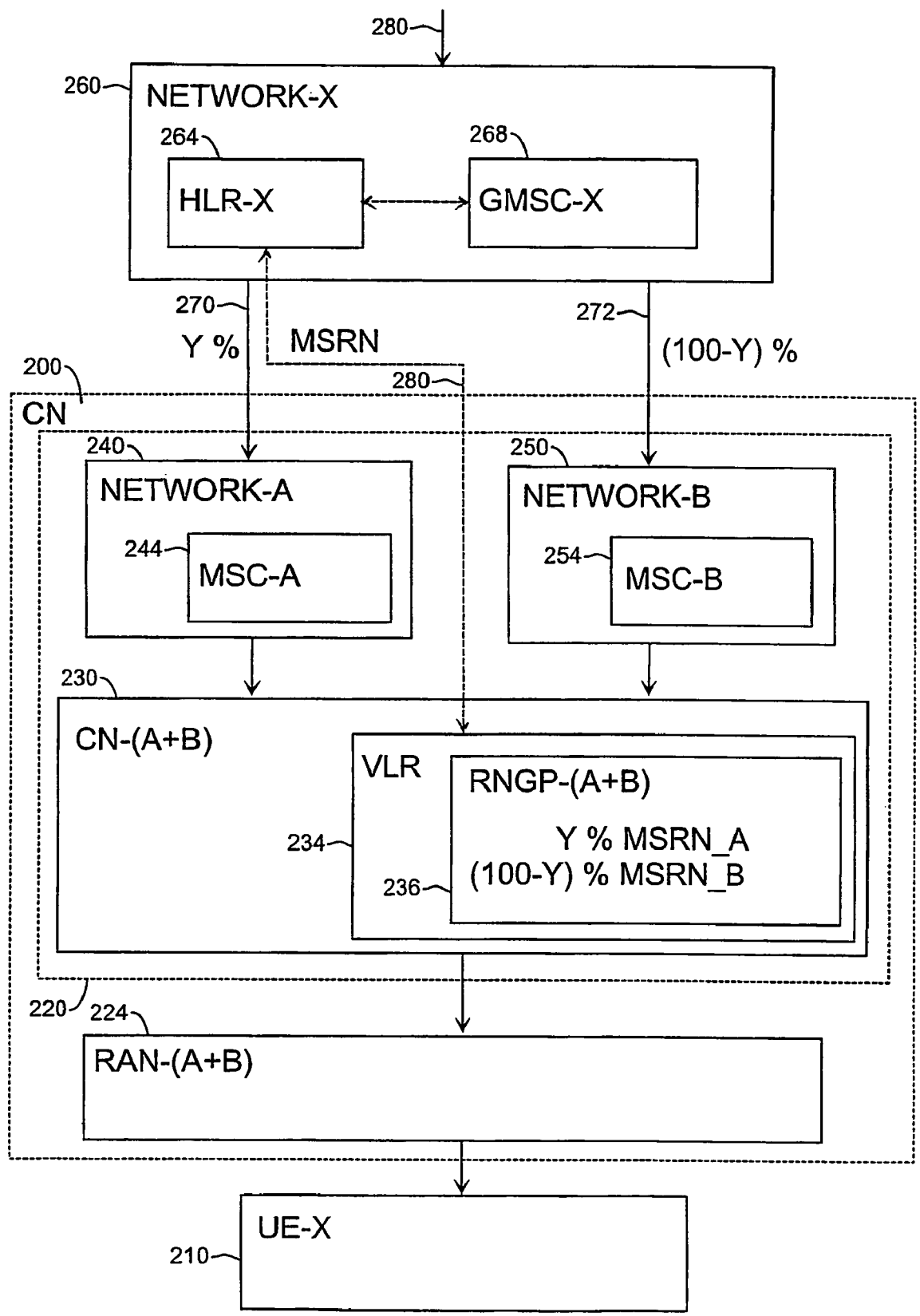

The invention is now described in closer detail in connection with the preferred embodiments and with reference to the accompanying drawings, in which FIG. 1 shows an example of a structure of a radio system, and FIG. 2 shows an example of a structure of a shared mobile network.

DESCRIPTION OF EMBODIMENTS

Since the present solution is suitable for use in mobile networks between different generations, embodiments will be described in a network system illustrated in FIG. 1, wherein network elements of different generations coexist. In the description, a 2G radio system is represented e.g. by a GSM (Global System for Mobile Communications). A 2.5G is represented e.g. by a GPRS (General Packet Radio System). A 3G radio system is represented e.g. by a system which is based on the GSM system and which utilizes 3G EDGE (Enhanced Data Rates for Global Evolution) technology, and systems known at least by the names IMT-2000 (International Mobile Telecommunications 2000) and UMTS (Universal Mobile Telecommunications System). The embodiments are not, however, restricted to these systems described as examples but a person skilled in the art can also apply the teachings to other radio systems comprising corresponding characteristics.

FIG. 1 is a simplified block diagram showing, at a network element level, the most important parts of a radio system. The structure and functions of the network elements are only described when relevant to the pre sent solution.

The main parts of a radio system are a core network (CN) 100, a radio access network 130 and user equipment (UE) 170. A radio access network called UTRAN (UMTS Terrestrial Radio Access Network) 130 belongs to the third generation and is implemented by wideband code division multiple access (WCDMA) technology. FIG. 1 also shows a base station system 160 implemented by time division multiple access (TDMA) technology.

On a general level, the radio system can also be defined to comprise user equipment and a network part. The user equipment is also called a terminal, subscriber terminal and a mobile telephone. The network part comprises the fixed infrastructure of the radio system, i.e. the core network, radio access network and base station system.

The structure of the core network 100 corresponds to a combined structure of the GSM and GPRS systems. The GSM network elements are responsible for establishing circuit-switched connections, and the GPRS network elements are responsible for establishing packet-switched connections; some of the network elements are, however, included in both systems.

A mobile services switching centre (MSC) 102, or an MSC server (MSS), is the centre point of the circuit-switched side of the core network 100. The same mobile services switching centre 102 can be used to serve the connections of both the radio access network 130 and the base station system 160. The tasks of the mobile services switching centre 102 include: switching, paging, user equipment location registration, handover management, collection of subscriber billing information, encryption parameter management, and echo cancellation.

The number of mobile services switching centres 102 may vary: a small network operator may only have one mobile services switching centre 102 but large core networks 100 may have several ones. FIG. 1 shows a second mobile services switching centre 106, but in order to keep FIG. 1 sufficiently clear, the connections of the second mobile services switching centre 106 to other network elements are not shown.

Large core networks 100 may have a separate gateway mobile services switching centre (GMSC) 110, which is responsible for circuit-switched connections between the core network 100 and external networks 180. The gateway mobile services switching centre 110 is located between the mobile services switching centres 102, 106 and the external networks 180. An external network 180 can be for instance a public land mobile network (PLMN) or a public switched telephone network (PSTN).

A home location register (HLR) 114 comprises a permanent subscriber register, i.e. the following information, for instance: an international mobile subscriber identity (IMSI), a mobile subscriber ISDN number (MSISDN), an authentication key, and when the radio system supports GPRS, a packet data protocol (PDP) address.

A visitor location register (VLR) 104 contains roaming information on user equipment 170 in the area of the mobile services switching centre 102. The visitor location register 104 comprises almost the same information as the home location register 114, but in the visitor location register 104, the information is kept only temporarily. The visitor location register 104 comprises information needed for processing calls placed or received by user equipment 170 registered in a database of the visitor location register 104. The visitor location register 104 may also receive necessary additional information from the home location register 114. The visitor location register 104 comprises the following information, for example: an international mobile subscriber identity (IMSI), a mobile subscriber ISDN number (MSISDN), a mobile station roaming number (MSRN) and the location area (LA) of a mobile station.

An equipment identity register (EIR) 112 comprises the international mobile equipment identities (IMEI) of the user equipment 170 used in the radio system, and a so-called white list, and possibly a black list and a grey list.

An authentication centre (AuC) 116 is always physically located in the same place as the home location register 114, and it comprises a subscriber authentication key and a corresponding IMSI.

The network elements shown in FIG. 1 are functional entities whose physical implementation may vary. Usually, the mobile services switching centre 102 and the visitor location register 104 constitute one physical device while the home location register 114, equipment identity register 112 and the authentication centre 116 constitute another physical device.

A serving GPRS support node (SGSN) 118 is the centre point of the packet-switched side of the core network 100. The main task of the serving GPRS support node 118 is to transmit and receive packets together with the user equipment 170 supporting packet-switched transmission by using the radio access network 130 or the base station system 160. The serving GPRS support node 118 contains subscriber and location information related to the user equipment 170.

A gateway GPRS support node (GGSN) 120 is the packet-switched side counterpart to the gateway mobile services switching centre 110 of the circuit-switched side with the exception, however, that the gateway GPRS support node 120 must also be capable of routing traffic from the core network 100 to external networks 182, whereas the gateway mobile services switching centre 110 only routes incoming traffic. In our example, external networks 182 are represented by the Internet.

The base station system 160 comprises a base station controller (BSC) 166 and base transceiver stations (BTS) 162, 164. The base station controller 166 controls the base transceiver station 162, 164. In principle, the aim is that the devices implementing the radio path and their functions reside in the base transceiver station 162, 164 while control devices reside in the base station controller 166.

The base station controller 166 is responsible for the following tasks, for instance: radio resource management of the base transceiver station 162, 164, intercell handovers, frequency control, i.e. frequency allocation to the base transceiver stations 162, 164, management of frequency hopping sequences, time delay measurement on the uplink, implementation of the operation and maintenance interface, and power control.

The base transceiver station 162, 164 comprises at least one transceiver which implements one carrier, i.e. eight time slots, i.e. eight physical channels. Typically, one base transceiver station 162, 164 serves one cell, but a solution is also possible wherein one base transceiver station 162, 164 serves several sectored cells. The tasks of the base transceiver station 162, 164 include, for example: calculation of timing advance (TA), uplink measurements, channel coding, encryption, decryption, and frequency hopping.

The radio access network 130 comprises radio network sub-systems 140, 150. Each radio network subsystem 140, 150 comprises radio network controllers (RNC) 146, 156 and nodes B 142, 144, 152, 154. Node B is a rather abstract concept; the term 'base transceiver station' is often used instead.

Operationally, the radio network controller 146, 156 corresponds approximately to the base station controller 166 of the GSM system, and node B 142, 144, 152, 154 corresponds approximately to the base transceiver station 162, 164 of the GSM system. Solutions also exist in which the same device is both the base transceiver station and node B, i.e. the device is capable of implementing both the TDMA and WCDMA radio interfaces simultaneously.

The user equipment 170 comprises two parts: mobile equipment (ME) 172 and a UMTS subscriber identity module (USIM) 174. The GSM system naturally uses its own identity module. The user equipment 170 comprises at least one transceiver for establishing a radio link to the radio access network 130 or base station system 160. The user equipment 170 may comprise at least two different subscriber identity modules. The user equipment 170 further comprises an antenna, a user interface and a battery. Today, different types of user equipment 170 exist, for instance equipment installed in cars, and portable equipment.

The USIM 174 comprises user-related information and information related to information security in particular, for instance an encryption algorithm.

A public land mobile network (PLMN) 180 is a public provider of mobile communication services, usually maintained and managed by administrative authorities or a recognized private operating agency (RPOA). For the sake of simplicity, the administrative authority or the RPOA operating the PLMN is called a network operator. The public land mobile network 180 may comprise one or more MSC areas which have a numbering plan and a routing plan in common. An MSC area, in turn, is a part of a mobile network covered by one mobile services switching centre 102. Each MSC area may comprise one or more location areas (LA). A location area, in turn, comprises an area in which the user equipment 170 is able move freely without updating the visitor location register 104. Each location area may comprise one or more base transceiver cells.

Operationally, each public land mobile network 180 can be considered to be an independent network unit, although the mobile networks of different network operators may communicate e.g. via a public switched telephone network (PSTN), an ISDN connection or a packet data network (PDN) in order to transmit calls and network information. A mobile service subscriber can access a service of a mobile network by making an agreement with a network operator. The network operator then provides the subscriber with identifiers, such as an IMSI identifier, in order to authorize the subscriber to use the services of the network operator. It is assumed herein that each subscriber terminal 170 identifies with at least one subscriber.

A service area is an area consisting of one or more public land mobile networks 180, and within this area, a connection can be established to the user equipment 170 from some other user equipment or a fixed telephone without the subscriber to the connection having to know the whereabouts of the user equipment 170. A service area is usually determined by the radio system standard used, and in the case of a widely used radio system standard, a service area may be quite large, comprising numerous mobile networks possibly even on several different continents. In order to form a large service area, the network operators provide a roaming service for each other; a roaming service is a service form provided by a network operator wherein the network operator of a visiting subscriber is temporarily provided with access to a part of a mobile network of another network operator. In such a case, the visiting subscriber receives the same or almost the same service as while in his or her home network. A home mobile network is a mobile network maintained by the subscriber's network operator with which the visiting subscriber has made a service agreement.

Roaming is based on an agreement between the network operator of the home mobile system of the visiting subscriber and the network operator of a visited network, the agreement defining the price of a roaming service and the parameters, such as roaming numbers, to be used in call setup. A roaming number is allocated on a per call basis to a subscriber registered in the visitor location register of a visited network, and the roaming number is used for routing a call of the particular subscriber. A roaming number is usually allocated on a per call basis at the visitor location register 104. A roaming number includes the following information, for example: the country code (CC) of a visitor location register of a visited network; a national destination code (NDC), and a subscriber number.

The infrastructure of a mobile network can also be shared between different network operators, in which case some network elements are jointly used by the network operators and part of the network comprises the network elements of single network operators. This is called a shared network. A shared network enables, for example, 2G network operators to operate in a 3G network by using the spectrum of a 3G network operator, or a group of 2G licensees to obtain a shared licence for a 3G network. In one sharing scenario, a group of independent 3G licensees share a common infrastructure in order to obtain a large coverage in the whole area of a country or in selected areas thereof. In such a case, the sharing does not necessarily involve operator-specific network elements.

The network elements of a mobile communication system can be shared in many different ways. In an embodiment of the present solution, a mobile communication system comprises a radio access network shared by network operators. In an embodiment, a core network comprises network elements shared by network operators, and network elements managed and maintained independently by the network operators. The details of how a mobile communication system can be shared are not, however, relevant to the present solution.

FIG. 2 shows an example of a shared mobile network 200 comprising a radio access network 224 shared between Operator A 240 and Operator B 250 and a partly shared core network 220. There can also be more network operators 240, 250 to share the mobile network 200. Operationally, the network elements shown in FIG. 2 correspond to the network elements of the radio system shown in FIG. 1. The core network 220 comprises a shared block 230 of the core network, Operator A block 240 and Operator B block 250. Reference numbers 240 and 250 are herein also used for identifying both network operators and blocks managed by the operators. The shared block 230 comprises a visitor location register 234 and mobile services switching centres (not shown in FIG. 2). The operator-specific blocks 240, 250 also comprise other network elements managed by each network operator, such as block-specific mobile services switching centres 244, 254, home location registers and gateway MSCs (not shown in FIG. 2). Each of the networks of the network operators sharing the network 200 may have a public telephone network connection to communication systems external to the network 200. FIG. 2 further shows a subscriber 210 within the area of the mobile network 200, and the subscriber's 210 home PLMN 260 comprising a home location register 264 and a gateway MSC 268. The home PLMN 260 of the visiting subscriber 210 is connected to the shared mobile network 200 e.g. through a public switched telephone network (PSTN).

The mobile network 200 can be shared based on an agreement between the network operators 240, 250 participating in the sharing system. The shared network elements of the mobile network 200 have thus been shared between Operators A and B e.g. such that Operator A has a Y % share of the network, which means that Operator B has a (100-Y) % share of the network. When the subscriber 210 is a subscriber to either network operator 240, 250 sharing the network, a call of the particular subscriber is directed through the network of the subscriber's own network operator 240, 250. A similar situation occurs when the subscriber 210 roams the shared network 200 and the visiting subscriber has a roaming agreement only with one network operator 240, 250 sharing the network 200. The call is then routed via the network of the network operator with which the roaming agreement was made. In the above cases, a call can be established according to the prior art.

In the present solution, an interesting situation occurs when the subscriber 210 is a subscriber to Operator X, which does not participate in sharing the mobile network 200 but which has a roaming agreement separately with each network operator 240, 250 sharing the network or with a group containing the network operators 240, 250. In such a case, the subscriber 210 roams the mobile communication system 200 shared by Operators A and B.

Examine a situation wherein the subscriber 210 roams the area of the mobile network 200 and wherein a radio connection between the subscriber 210 and the radio access network 224 has been established. Roaming starts by the mobile services switching centre of the radio access network 224 receiving the registration of the visiting subscriber 210 and informing the visitor location register 234 that the visiting subscriber 210 has arrived. In fact, from a point of view of the visitor location register, also the subscriber of the visited network is a visiting subscriber. Therefore, the scope of the invention is not limited to a case wherein the visiting subscriber roams and the operators have a specific roaming agreement.

For ease of discussion, we consider situations where the subscriber 210 is the receiver of a mobile-terminated call. For those skilled in the art, procedures are known wherein a call originates from the subscriber 210 him- or herself. On a general level, a call can also be any connection that is routed by employing the procedures described in the present solution. After call setup at the calling party, the call is directed e.g. through a public telephone network to the gateway MSC 268 of the home network 260 of the subscriber 210, which interrogates information related to the routing of the call terminating at the subscriber 210 from the home location register 264 of the home network 260. In the case of the call terminating at the visiting subscriber 210, the party which orders the call does not direct the order of the call to any specific telephone line or a specific location but to a record of the home location register 264. When the subscriber 210 is not located within the area of his or her home network 260, the home location register 264 asks the visitor location register 234 of the visited network 200 to allocate a roaming number 280 to the subscriber 210. After receiving the roaming number 280, the home location register 264 delivers it to the gateway MSC 268 of the home network 260 of the subscriber 210, which routes the call on the basis of the received roaming number 280.

In the present solution, the interesting point is the method by which the visitor location register 234 allocates the roaming number to a mobile-terminated call of a visiting subscriber 210 such that the allocation is directed at a roaming number pool of each network operator 240, 250 sharing the mobile network 200 at a predetermined frequency. A roaming number pool comprises at least one operator-specific roaming number. The roaming number of a network operator comprises information, which enables each roaming number to be identified with the network operator such that the information enables a subscriber-terminated call to be routed via the network elements of the particular network operator. The roaming numbers allocated at a predetermined frequency then lead to the fact that in the shared mobile network 200 in the routing of calls terminating at visiting subscribers, the networks of each network operator 240, 250 are used by predetermined weights. For example, according to the above-mentioned network sharing, Y % of the calls 270 would be routed to the network of Operator A, and (100-Y) % of the calls 272 to the network of Operator B; however, the basis of a routing ratio is irrelevant to the present solution.

Next, examine embodiments that can be used for forming a visitor location register 234 and allocating a roaming number.

Each network operator 240, 250 sharing the network 200 can be provided with a specific roaming number space comprising at least one network-operator-specific roaming number which includes information that enables a call to be routed via the network elements of the network operator managing the number space.

In an embodiment, a roaming number (MSRN) group 236 which includes roaming numbers of each network operator 240, 250 sharing the mobile network and which is identifiable with the home PLMN of the visiting subscriber 210 is formed in the visitor location register 234. The roaming number is then allocated by selecting a roaming number from the roaming number group 236. Identification between a roaming number group and a subscriber's home communication system means that the roaming number group 236 to be used is selected on the basis of the home PLMN 260 of the visiting subscriber 210 e.g. by means of the IMSI number of the visiting subscriber 210. In an embodiment, the roaming number group 236 comprises, in a predetermined proportion, roaming numbers of each network operator 240, 250 sharing the mobile network 200, in which case the numbers can be selected by random sampling or by allocating the roaming numbers in rotating order. The roaming numbers of network operators 240, 250 are then used in proportion to the total number of roaming numbers of each network operator in the roaming number group 236.

In an embodiment, a roaming number group 236 which includes the MSRN ranges of the network operators 240, 250 sharing the mobile network 200 is formed in the visitor location register 236, the lengths of the MSRN ranges determining the frequency of the roaming numbers of each network operator. An MSRN range 236 comprises roaming numbers such that the number of roaming numbers in the MSRN range, and thus the frequency of the roaming numbers, can be determined on the basis of the first and the last number in the MSRN range. Each roaming number occurs only once in the visitor location register 234 and each allocated roaming number 280 can be allocated to only one mobile-terminated call 210 at a time.

The method according to the present solution for allocating roaming numbers and for routing mobile-terminated calls to visiting subscribers can also be used when the network 200 is operated by a single network operator. In such a case, the calls to the visited network 200, before entering the visited network 200, are routed in a third party's network or in a PSTN network based on the routing information carried by the allocated roaming number.

Although the invention has been described above with reference to the example in accordance with the accompanying drawings, it is obvious that the invention is not restricted thereto but can be modified in many ways within the scope of the inventive idea disclosed in the attached claims.

The invention claimed is:

1. A method, comprising:
receiving a request to allocate a roaming number to a call of a subscriber based on an order for the call of the subscriber;
allocating, by a processor, the roaming number to the call of the subscriber, associated with the roaming number of each network operator sharing a mobile network in a predetermined proportion,
wherein the mobile network comprises elements shared between at least two network operators;

receiving the request to allocate the roaming number to a mobile-terminated call of the subscriber based on an order for the mobile-terminated call of the subscriber from a home network;

allocating the roaming number to the mobile-terminated call of the subscriber; and transmitting the allocated roaming number to the home network, wherein the home network is configured to route the mobile-terminated call to the subscriber based on the allocated roaming number.

2. The method as claimed in claim 1, further comprising: allocating the roaming number to the call of a visiting subscriber.

3. The method as claimed in claim 1, further comprising: allocating the roaming number to a mobile-terminated call of the subscriber.

4. The method as claimed in claim 1, where at least one network element of the mobile network is jointly used by the network operators.

5. A method, comprising:
receiving a request to allocate a roaming number to a call of a subscriber based on an order for the call of the subscriber; and allocating, by a processor, in a predetermined proportion the roaming number to the call of the subscriber, by selecting the roaming number associated with a network operator from a roaming number group which includes, in a predetermined proportion, roaming numbers of the network operators sharing a mobile network;

receiving the request to allocate the roaming number to a mobile-terminated call of the subscriber based on an order for the mobile-terminated call of the subscriber from a home network;

allocating the roaming number to the mobile-terminated call of the subscriber; and transmitting the allocated roaming number to the home network, wherein the home network is configured to route the mobile-terminated call to the subscriber based on the allocated roaming number.

6. The method as claimed in claim 1, further comprising:
allocating the roaming number by selecting the roaming number from a roaming number group which includes a mobile station roaming number range of each network operator sharing the mobile network, a length of the mobile station mobile number range determining a predetermined rate of occurrence of roaming numbers of each network operator.

7. The method as claimed in claim 1, further comprising:
allocating the roaming number by selecting the roaming number from a roaming number group identifiable with a home public switched telephone network of the subscriber.

8. The method as claimed in claim 1, wherein the mobile network includes a radio access network shared between at least two network operators.

9. The method as claimed in claim 1, wherein the mobile network includes a core network of the mobile network comprising elements of at least two different network operators.

10. An apparatus, comprising:
a processor configured to allocate a roaming number to a call of a subscriber such that the allocation is directed at the roaming number of each network operator sharing a mobile network in a predetermined proportion, wherein the mobile network comprises elements shared between at least two network operators;

to receive a request to allocate the roaming number to a mobile-terminated call of the subscriber based on an order for the mobile-terminated call of the subscriber from a home network;

to allocate the roaming number to the mobile-terminated call of the subscriber; and to transmit the allocated roaming number to the home network, wherein the home network is configured to route the mobile-terminated call to the subscriber based on the allocated roaming number.

11. The apparatus as claimed in claim 10, wherein the processor is configured to allocate the roaming number to the call of a visiting subscriber.

12. The apparatus as claimed in claim 10, wherein the processor is configured to allocate the roaming number by selecting the roaming number from a roaming number group which includes, in a predetermined proportion, roaming numbers of the network operators sharing the mobile network.

13. The apparatus as claimed in claim 10, wherein the processor is configured to allocate the roaming number by selecting the roaming number from a roaming number group which includes a mobile station roaming
number range of a network operator sharing the mobile network, a length of the mobile station roaming number range determining the predetermined rate of occurrence of the roaming numbers of the network operator.

14. The apparatus as claimed in claim 10, wherein the processor is configured to allocate the roaming number by selecting the roaming number from a roaming number group identifiable with a home public land mobile network of the subscriber.

15. The apparatus as claimed in claim 10, wherein the mobile network includes a radio access network shared between at least two network operators.

16. The apparatus as claimed in claim 10, wherein the mobile network includes network elements of at least two network operators.

17. The apparatus as claimed in claim 10, wherein the apparatus is a register of then mobile network.

18. An apparatus, comprising:
a receiver configured to receive a request to allocate a roaming number to call of a subscriber based on an order for the call of the subscriber; and a processor configured to allocate the roaming number to the call of the subscriber, associated with the roaming number of each network operator sharing a mobile network in predetermined proportion, wherein the mobile network comprises elements shared between at least two network operators;

to receive the request to allocate the roaming number to a mobile-terminated call of the subscriber based on an order for the mobile-terminated call of the subscriber from a home network;

to allocate the roaming number to the mobile-terminated call of the subscriber; and to transmit the allocated roaming number to the home network, wherein the home network is configured to route the mobile-terminated call to the subscriber based on the allocated roaming number.

19. An apparatus, comprising:
receiving means for receiving a request to allocate a roaming number to a call of a subscriber based on an order for the call of the subscriber; and allocating means for allocating the roaming number to the call of the subscriber, associated with the roaming number of each network operator sharing a mobile network in predetermined proportion, wherein the mobile network comprises elements shared between at least two network operators;

means for receiving the request to allocate the roaming number to a mobile-terminated call of the subscriber based on an order for the mobile-terminated call of the subscriber from a home network;

means for allocating the roaming number to the mobile-terminated call of the subscriber; and means for transmitting the allocated roaming number to the home network, wherein the home network is configured to route the mobile-terminated call to the subscriber based on the allocated roaming number.

20. An apparatus, comprising: a receiver configured to receive a request to allocate a roaming number for a call; and a processor configured to allocate the roaming number on the basis of a proportion with which each network shares the apparatus;

to receive a request to allocate the roaming number to a mobile-terminated call of the subscriber based on an order for the mobile-terminated call of the subscriber from a home network;

to allocate the roaming number to the mobile-terminated call of the subscriber; and to transmit the allocated roaming number to the home network, wherein the home network is configured to route the mobile-terminated call to the subscriber based on the allocated roaming number, wherein the apparatus is shared between at least two network operators according to the predetermined proportion.

21. A method, comprising:

receiving a request to allocate a roaming number to a call of a subscriber based on an order for the call of the subscriber; and allocating, by a processor, the roaming number to the call of the subscriber, associated with the roaming number of each network operator sharing a mobile network in a predetermined proportion, wherein the mobile network comprises elements shared between at least two network operators, and wherein the sharing of the mobile network and the allocating the roaming number are based on a same proportion;

receiving the request to allocate the roaming number to a mobile-terminated call of the subscriber based on an order for the mobile-terminated call of the subscriber from a home network;

allocating the roaming number to the mobile-terminated call of the subscriber; and transmitting the allocated roaming number to the home network, wherein the home network is configured to route the mobile-terminated call to the subscriber based on the allocated roaming number.

22. An apparatus, comprising:

a processor configured to allocate a roaming number to a call of a subscriber such that the allocation is directed at the roaming number of each network operator sharing a mobile network in a predetermined proportion, wherein the mobile network comprises elements shared between at least two network operators;

to receive a request to allocate the roaming number to a mobile-terminated call of the subscriber based on an order for the mobile-terminated call of the subscriber from a home network;

to allocate the roaming number to the mobile-terminated call of the subscriber; and to transmit the allocated roaming number to the home network, wherein the home network is configured to route the mobile-terminated call to the subscriber based on the allocated roaming number, wherein the sharing of the mobile network and the allocation of the roaming number are based on a same proportion.

* * * * *